(12) United States Patent  (10) Patent No.: US 8,496,861 B2
Kaufmann et al.  (45) Date of Patent: Jul. 30, 2013

(54) PROCESS FOR MAKING PLASTIC FIBERS FOR APPLICATION IN CONCRETE (75) Inventors: Josef Kaufmann, Opfikon (CH); Eugen Schwitter, Mollis (CH)

(73) Assignees: Eidgenossische Materialprufungs-und Forschungsanstalt, Dubendorf (CH); Fibrotec AG, Mollis (CH)

( * ) Notice: Subject to any disclaimer, the term of this patent is extended or adjusted under 35 U.S.C. 154(b) by 0 days.

(21) Appl. No.: 13/397,789

(22) Filed: Feb. 16, 2012

(65) Prior Publication Data

US 2012/0146254 A1  Jun. 14, 2012

Related U.S. Application Data (62) Division of application No. 12/067,860, filed as application No. PCT/CH2006/000511 on Sep. 21, 2006, now abandoned.

(30) Foreign Application Priority Data

Sep. 30, 2005  (CH) ....................................... 1582/05

(51) Int. Cl.
*D01D 5/12* (2006.01)
*D01D 5/34* (2006.01)
*D01F 1/10* (2006.01)
*D02J 3/02* (2006.01)
*D02J 3/10* (2006.01)

(52) U.S. Cl.
USPC ................... 264/151; 264/172.15; 264/210.2; 264/210.6; 264/210.8; 264/211.12

(58) Field of Classification Search
USPC ........... 264/151, 172.15, 210.2, 210.6, 210.8, 264/211.12
See application file for complete search history.

(56) References Cited

U.S. PATENT DOCUMENTS

| 3,998,988 A | 12/1976 | Shimomai et al. |
| 4,961,790 A | 10/1990 | Smith et al. |
| 5,352,518 A | 10/1994 | Muramoto et al. |
| 6,844,065 B2 | 1/2005 | Reddy et al. |
| 7,025,825 B2 | 4/2006 | Pyzik et al. |
| 2001/0023019 A1 | 9/2001 | Rieder et al. |
| 2001/0047045 A1 | 11/2001 | Pyzik et al. |
| 2003/0194543 A1* | 10/2003 | Kawabata et al. .......... 428/294.1 |
| 2004/0258911 A1* | 12/2004 | Pyzik et al. .................... 428/364 |
| 2009/0169885 A1* | 7/2009 | Carter ....................... 264/151 X |

FOREIGN PATENT DOCUMENTS

| EP | 1350773 A | 10/2003 |
| JP | 06009254 A | 1/1994 |

* cited by examiner

*Primary Examiner* — Leo B Tentoni
(74) *Attorney, Agent, or Firm* — Brian Roffe (57) ABSTRACT Method for making plastic fiber for application in concrete with largest grain diameters >4 mm, with an average diameter of 0.15 to 2 mm, corresponding to approximately 160 to 28,000 dtex. Using a co-extrusion process, a bi-component fiber is formed having a central core and a casing around the central core, the central core and the casing contain different pure polymers or polymer mixtures, and then the co-extruded bi-component fiber is stretched by a factor of 5 to 15, and thereafter a structured or grooved surface is embossed onto the co-extruded stretched bi-component fiber. The embossing is performed such that a depth of the embossing is more than 10% of an average fiber diameter, and a maximal distances of structure tips within incorporated structures of the embossing in an axial direction lie in a region between 0.5 mm and 3 mm.

20 Claims, 7 Drawing Sheets

PROCESS FOR MAKING PLASTIC FIBERS FOR APPLICATION IN CONCRETE

CROSS-REFERENCE TO RELATED APPLICATION

This application is a divisional of U.S. patent application Ser. No. 12/067,860, filed Mar. 24, 2008, now abandoned, which is a National Stage filing of International Application No. PCT/CH06/00511 filed Sep. 21, 2006 which claims priority of Swiss Patent Application No. 1582/05 filed Sep. 30, 2005, all of which are incorporated by reference herein.

FIELD OF THE INVENTION

The invention relates to special plastic fibers, witch are suitable for the application in concrete with a largest grain diameter of 4 mm and more, and thereby decisively improve the tensile strength and post-failure behavior of these building materials.

BACKGROUND OF THE INVENTION

The tensile strength of concrete is lower than its compressive strength by a factor of approx. 10. The failure is effected in a relatively brittle manner. Concrete therefore needs to be reinforced when accommodating tensile forces or shear forces on the building construction. Safety considerations are often at the forefront. A concrete component on exceeding the maximal load should not break in a catastrophic and abrupt manner, but firstly absorb a certain amount of energy, thus display a ductile behavior. Both are conventionally achieved by way of steel reinforcement. The type of reinforcement is planned in a detailed manner and then the reinforcements are applied in costly manner mostly by hand. In certain cases, one may do away with conventional steel reinforcement completely or partly by way of admixing shortly cut steel fibers. Steel fibers however have decisive disadvantages. They are prone to corrosion which often leads to ugly strips of rust or spots on the concrete. They further entail the danger of injury. They also have poor dosing and mixing properties as a result of their rigidity. Large dosing weights arise as a result of the large density, witch shows up in the costs. The admixing of steel fibers also leads to a relative high scatter of the material properties due to the non-uniform distribution. Other fiber types, such as glass fibers, have decisive disadvantages, for example a limited resistance to alkali.

The use of plastic fibers offers an alternative. The fibers thereby on the one hand need to have a relatively large tensile strength, and on the other hand need to have a high bonding strength with the concrete. In the case of loading, the static friction on the complete surface of the fiber is to remain effective, so that the fiber is uniformly pulled out and is in the position of absorbing a lot of failure energy. Inexpensive fiber types, in particularly also compared directly to steel fibers, may be manufactured on the basis of polyolefin's (polypropylene, polyethylene) or other thermoplastic plastics. Whilst one succeeds with this, in achieving notable tensile strengths with values which to some extent are better than steel, the modulus of elasticity and the bonding strength to concrete is generally low with these types of fibers. An improvement of the static friction may be achieved by increasing the E-modulus of the fibers, manufactured of relatively expensive raw materials.

Multi-layered, thermoplastic plastic fibers for reinforcing concrete are known from EP 1350773. There, it is particularly emphasized that the polymers of the different layers have different melting points. The polymer with the lower melting point lies in the core, that with the higher one lies in the casing, wherein the difference is to be 10° C. to 20° C. This measure is to serve for the stretching after heating in a special oven, in that the inner layer is likewise adequately heated with the heating of the outer layer, so that a stretching by the factor 3 to 12 is possible. By way of the stretching, the plastic molecules are orientated longitudinally. The strength in the plastic is firstly achieved by way of this. These plastic fibers are provided on their outer side with structures before the stretching, for increasing the adhesive force in the concrete. In detail, these filaments are manufactured such that a double-layered or multi-layered film is created by way of co-extrusion. Afterwards, this film is provided with an embossing by way of calendar. The film is subsequently cut into narrow striplets. At the end, the two-dimensional striplets are yet stretched, by which means the bulges or thin- and thick locations effectively arise.

It is however important to ascertain that the embossing and stretching take place in a coherent process. Partial material accumulations arise due to the embossing in the undrawn condition, as is taught by EP 1350773 A2. The polymer which is displaced by the structuring is still amorphous. If one draws thereafter, then firstly the zone with the smallest material accumulation is stretched. It is generally known and also obvious that firstly the locations with smallest resistance are drawn during each stretching process. In this case, this is clearly the thin locations. For this reason previously embossed striplets may not be uniformly drawn at the end, thus after a stretching after the effected embossing. It would be difficult or even impossible whilst maintaining favorable production conditions, which means whilst avoiding filament breakages, to be able to completely stretch filaments embossed in such a manner at all. The thin locations would be completely stretched, whilst at the thick locations, the degree of stretching and thus also the orientation of the molecules must necessarily be smaller. By way of this, the bulges which are manufactured according to this method are softer than the other locations of the filament, and accordingly they have an insufficiently high modulus of elasticity. This means that the bulges—on pulling out—are slightly worn. Furthermore, it is basically not possible to obtain sharp-edged bulges by way of stretching after the embossing, since the profile of the bulges are "blurred" due to the drawing, which is clearly evident in FIG. 1 of EP 1,350,773 A2. Since each chain is only as strong as its weakest member, this method also entails a certain amount of material wastage, since an over-proportional amount of polymer needs to be used, in order to achieve the designed strength values in the thin locations. FIG. 1(A) in EP 1,350,773 A2 likewise makes this point clear. With the embossing before the stretching, one may only achieve bulges which have a very large distance to one another. Thus in [0041] of EP 1350773 A2 it is mentioned that the stretch ratio is to be between 3:1 to 12:1 and preferably between 5:1 to 10:1. With a pyramid embossing as is shown in FIG. 1 (B), and after a subsequent minimal total drawing (stretch factor) of 5, the distances from bulge to bulge is 5 mm, with a total drawing of 10, which represents the absolute minimum with a high-strength PP or HDPE-filament, thus a distance of 10 mm from bulge to bulge results, without taking into account the embossing gap! FIG. 1 (A) of EP 1350773 A2 furthermore very clearly illustrates the profile of the filaments which one obtains by way of an embossing before the stretching. The fibers are above-averagely thin in the web (thin locations). The thickenings continuously increase towards the bulges (thick locations) and after become increasing flatter. Thus to a certain extent a cone is formed on both sides by each bulge.

This particularity is always repeated with the method as is described under EP 1,350,773 A2, independently of which embossing type is selected, whether a pyramid, wave or angular profile, or a single-side or double-sided embossing. The bulges necessarily and always on both sides run out at a very acute angle to the diameter of the next thin location. The sliding out of the concrete, in comparison to a sharp embossing with marked transitions from the thin to the thick locations, is significantly more unfavorable.

Thus one may only achieve laterally flatted or rounded bulges which have a large distance to one another, with the embossing before the stretching, and furthermore it is clear that a structure conversion in the inside of the fibers is accepted as a result of the stretching which follows the embossing with regard to time. During each stretching process, firstly the locations with the smallest resistance are drawn. This in this case is clearly the thin locations produced on account of the structuring. For this reason, the fibers stretched after an embossing no longer have homogeneous molecule structures. Rather, the thin locations are completely stretched, whilst the degree of stretching at the thick locations and thus also the uniform orientation of the molecules is inevitably smaller. For this reason, an over-proportional amount of polymer is used, in order to achieve the desired strength values in the thin locations. Furthermore, the thick locations are soft, which likewise worsens the bonding to the concrete, and leads to a sliding out of the cement stone matrix, which is much more likely when compared to a hard polymer surface.

OBJECTS AND SUMMARY OF THE INVENTION

Against this background, it is the object of the present invention to provide plastic fibers for the application in cement-bonded building materials, in particular in concrete with a largest grain of greater than 4 mm in diameter, by way of which the mechanical properties of these building materials are significantly improved in that they comprise a homogeneous molecular structure, as well as denser embossing on their surface. At the same time, these plastic fibers should be more practical in their handling and admixing, should achieve their tensile strength with minimal masses, and be capable of competing with steel fibers with regard to cost.

This object is achieved by a plastic fiber for the application in concrete, with a largest grain diameter >4 mm, with an average diameter of 0.15 to 2 mm, corresponding to approx. 160 to 28,000 dtex (Decitex=gram per 10,000 running meters) which is characterized in that it is a bi-component fiber which is stretched by the factor 5 to 15 and is manufactured by way of a co-extrusion method from a central core and a casing which envelops this, of differently pure polymers or polymer mixtures, and that after the stretching has been effected, a continuously or interruptedly structured or grooved surface is embossed onto this continuously stretched bi-component fiber, wherein the depth of this structuring is more than 10% of this average fiber diameter, and the maximal distances of their structure tips within attached structures in the axial direction lie between 0.5 mm and 3 mm.

Due to the division into a core and a casing, on the one hand the casing polymer with respect to the workability (rheology) and the bonding strength between fiber and concrete, furthermore the degree of stiffness, the dimensional stability and the wear strength, and the one hand the core polymer with regard to the high tensile strength and a small extension at break, may be optimized independently of one another. By way of this, one may not only achieve fibers with very new, improved characteristics, but also reduce the costs, since it is not the complete fiber which must consist of expensive universal polymers, as is the case with full fibers. Furthermore, there results the possibility of applying the expensive components to a lesser extent, for example only in the casing. The casing polymer may be optimized to the desired bonding to the cement, on the one hand by way of embossing, and on the other hand by way of chemical modification on the surface. Thereby, the combination of both measures has been shown to be extremely effective.

BRIEF DESCRIPTION OF THE DRAWINGS

Different constructions of fibers which are suitable for incorporation into cement-bonded building material are shown in the accompanying drawings, and the effect in the concrete is displayed by way of measurement diagrams.

There are shown in.

DETAILED DESCRIPTION OF THE INVENTION

Some basic facts are explained here before dealing with the individual figures. Fibers which may be applied into concrete, in contrast to fibers in fiber cement products, have a significantly larger diameter of 0.15 to 2 mm, since otherwise with the usual fiber dosages for mechanical reinforcement, which is to say in the region of 0.3 to 2% by volume, one may not achieve an adequate workability of the building material. With such thick fibers, the bonding strength between the fiber and the building material, in particular based on inexpensive low-modular polymers such as polyolefin's, has hitherto been inadequate, since the cross section of the fiber reduces in the case of loading, and thus the fiber may easily slip out of its embedding. An increase of the bonding strength by way of a suitable polymer selection or by way of the increase of the adhesion to the concrete due to the increase of the surface tension of the fibers or due to a corona-, plasma- or fluoride treatment, or also by way of depositing wax dispersions or softenings, has been shown to be insufficient with low-molecular fibers and therefore also with bi-component fibers. With the use of high-modular plastics, the tapering of the cross section is only adequately reduced when the fiber for the large part or completely, is manufactured from these expensive raw materials. A bi-component fiber provided with an embossed structure now opens very new perspectives for the applications in concrete.

It is known, with thermoplastic raw materials, that the following parameters are decisive in order with fibers to achieve high strength values with a low extension and a high modulus of elasticity: the polymers must have a low MFR (melt flow rate) and a narrow molecular weight distribution. Thee melt flow rate is defined according to ISO 1133 and is a measure at which temperature and pressure loading, how much mass flows through a defined nozzle per time. Furthermore, the degree of stretching (drawing process after spinning) must be selected as high as possible. It is however also known that fibers with a diameter of 0.15 to 2 mm tend to split open (fibrillate) under mechanical loading in the longitudinal direction, which is very negative for the bonding between the cement and fibers. On pulling out of the concrete, the fibers are mechanically greatly loaded, and thereby a fibrillation inevitably occurs—when the polymer in the fabrication process has draw to its stretching limit. Polymers with a higher MFR and a broader molecular weight distribution have a significantly more beneficial behavior during the stretching process. This means that fibers, manufactured of such polymers may be drawn to a higher extent, until their absolute stretching limit is reached.

Usually filaments, this full fibers, or co-extruded filaments, thus e.g. core-casing fibers are manufactured according to the following system: after exit from the nozzles, wherein each fiber is pressed out through a separate bore, the indrawn fibrils are cooled in a water bath. The temperature of this bath may be controlled. Thin filaments cool quicker than thicker ones. During the subsequent stretching process, the filaments run through suitable heat sources (ovens) in a contact less manner in one or more process stages. Thin filaments cool and head up more quickly and more uniformly than thick ones with e.g. 0.15 to 2.0 mm diameter. Filaments with a larger mass store the molten energy in the centre for longer. Logically, the outer layers are cooled more than the inner layers in the water bath. The thermal equilibrium between the fiber centre and the fiber surface in this case is not achieved by polymers with different melting points, but by way of the thermal compensation as a result of the cooling bath and the thermal radiation as a result of the stretch oven temperatures. The plastic fibers presented here are produced according to this standard method for filaments. The melting points of both polymers, in the core as well as the casing, may be identical or also different, since these per se are of no significance for the later continued processing. Preferably however, polymers are used for the core and casing which display the same temperature behavior, which means they reach their melting point at the same temperature of approx. 165° C. On the other hand, one operates with polymers which have different viscosities after reaching the melting point, specifically a melt flow rate (MFR) of 0.8 and 35 g/10 Min. The casing polymer with 35 g/10 Min— with the same melting point—is about 44 times more liquid than the core polymer. The different MFRs counteract the fibrillation. The more liquid casing polymer is easer to stretch than the tougher core polymer. Thus, the not completely exhausted casing prevents the fibrillation.

With the path suggested here, of manufacturing the fiber of a core and a casing of different polymers, the best conditions are available for optimizing the fibers. The casing polymer on the one hand may be optimized with respect to the workability (rheology) and the bonding strength between the fiber and concrete, and the core polymer may be optimized independently thereof with regard to a high tensile strength and a small elongation at break. For this, a core-casing fiber has been created, whose core consists of polymers with a lower MFR and a very narrow molecular weight distribution, and whose casing consists of polymers with a higher MFR and a wider molecular weight distribution. With the stretching procedure, the core of a fiber designed in such a manner is maximized with regard to the mechanical properties, in that it is completely and homogeneously stretched, whereas the casing still has sufficient reserves, in order to reliably fix the fibers and way of this, to prevent the fibrillation under load. With such a fiber therefore, the core is designed in a targeted manner for the best possible mechanical values, and the casing for an optimal bonding to the cement. The completely, which is to say continuously and homogeneously stretched fiber is then provided with a structure at a later stage by way of embossing. Thereby, the completely stretched polymer with its longitudinally orientated molecules is only then yet to be displaced or reorientated, laterally or in depth. Observed over the total profile of the fibers, no weakening thin locations arise.

In trials, is was proven that the high strength values were retained by way of the additional incorporation of a mass of 3% to 25% of fine mineral particles, but the extension at break was reduced. Metallic salts, glass particles or glass balls or fiber materials of all types are suitable for such incorporation. The modulus of elasticity of the fibers was increased by way this, which is of great advantage with this application. Simultaneously, the incorporation of the minerals has the effect that the contraction of the fibers (necking) is reduced under loading, which in turn a positive effect on the pullout behavior.

It may be proven that the surface tension of the polymer is increased on account of the incorporation of functional groups, which likewise leads to an improved bonding between the fibers and the cement. This chemical modification however renders the polymers more expensive. Since with a core-casing fiber, only the casing comes into direct contact with the cement, only this needs to be modified. The share of the casing, depending on the design of the fiber, is approx. 20% to 50% of the total fiber mass. In order to achieve the same effect with a full fiber, the polymer of such a type would have to be modified in its entirety.

Thus fibers with very new and significantly improved properties may are designed by way of the combination of the measures described above. The costs may furthermore be reduced, since the whole fiber does not need to consist of expensive universal polymers, at this is the case with full fibers, but one may use expensive components to a low extent, for example only in the casing. The casing polymer may then be optimized to the desired bonding to the cement, on the one hand by embossing and one the other hand by a chemical modification of the surface. Thereby, the combination of these two measures has been proven to be extremely effective.

The structuring of the surface is effected preferably by way of a mechanical embossing of the bi-component fibers. Grooves are formed at the embossed part by way of the embossing procedure, and the plastic is simultaneously laterally displaced, which also effects a laterally structured surface which then acts in a positive manner with regard to the adhesion of the cement on the fiber and its meshing with the concrete. By way of this structuring, the building material matrix is not overcome, even with a tapering of the fiber cross section in the case of loading, thus even at lower fiber modules of elasticity.

Figure 7:
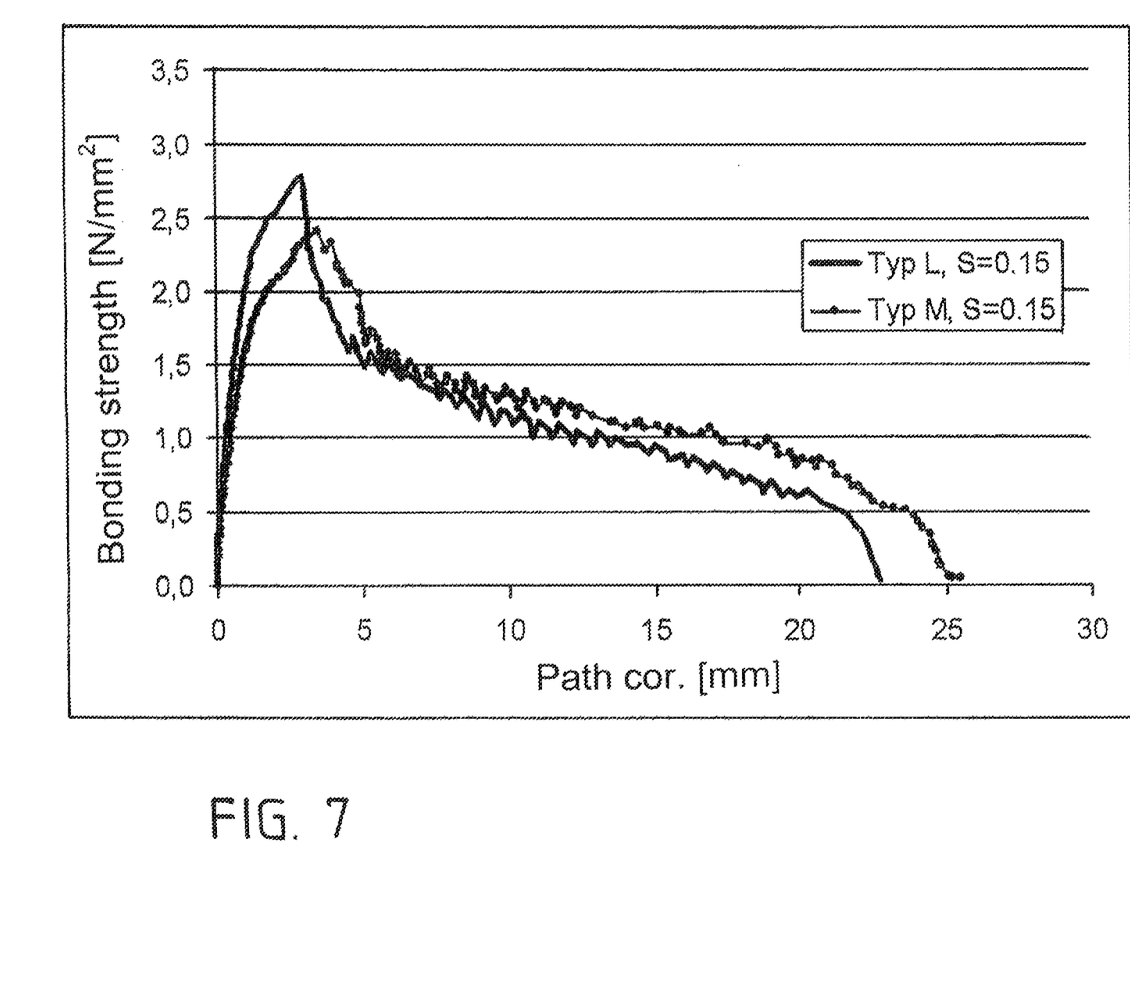
FIG. 7 is a force-path diagram for representing different bonding strengths with identical plastic fibers, wherein nanoparticles were applied in the casing polymer with the one fiber.

A further improvement of the bonding properties to concrete of bi-component fibers is particularly successful by way of the additional incorporation of a mass of 3% to 25% of fine nanoparticles with a grain diameter <1 µm in the form of minerals fillers in the casing polymer. The degree of stiffness and the surface wear strength is increased by way of this. Such a fiber is provided with an embossing in a similar or the same manner, in order to give it a structured surface. The embossing becomes harder and more precise due to the incorporation of nanoparticles. With the pullout of the fiber, there results a lower pullout path with same force transmission and a higher bonding strength, which is displayed in the diagram according to FIG. 7. The application of these particles only in the casing polymer leads to a decisive saving in mass and costs.

Figure 1:
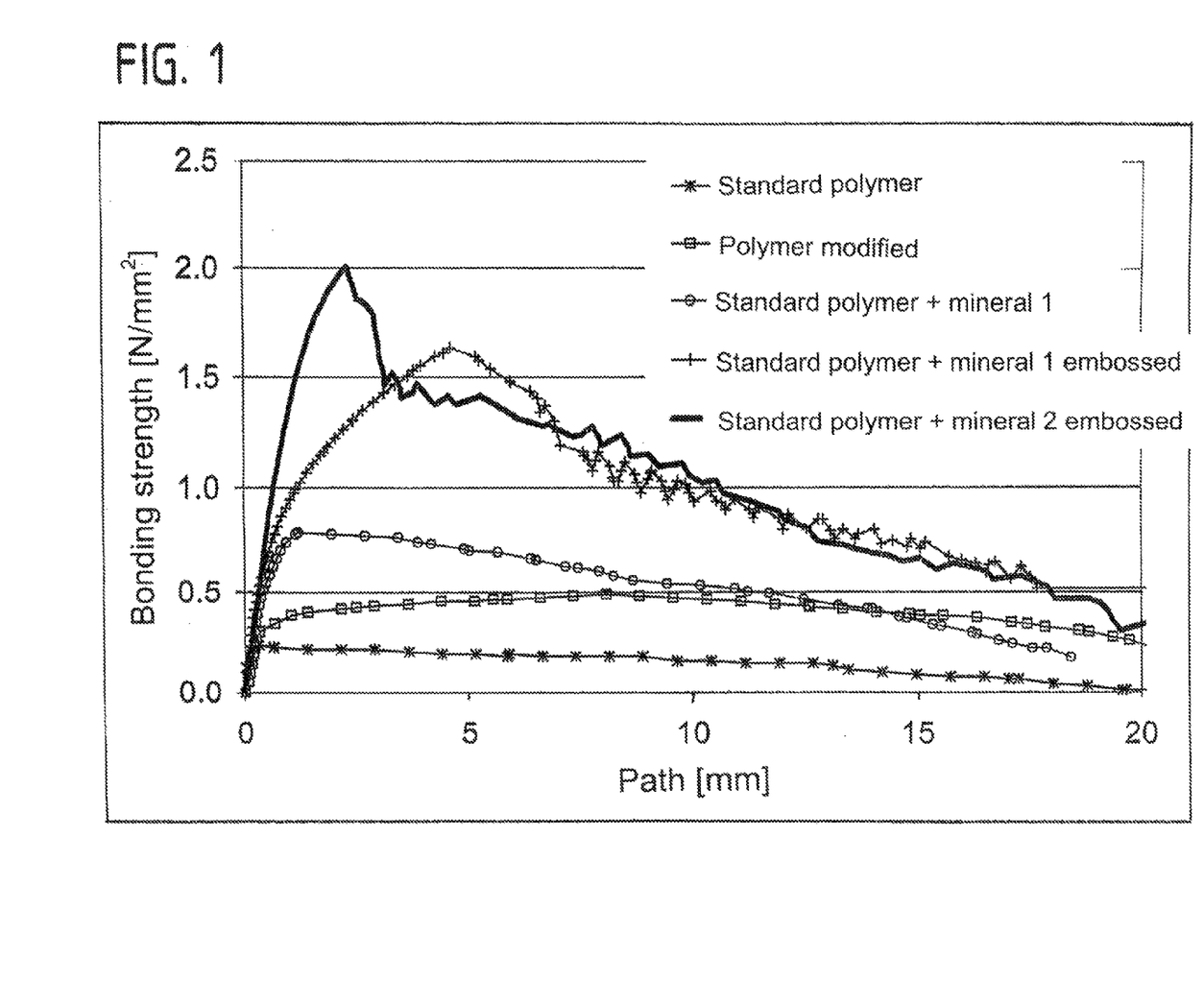
FIG. 1 is a force-path diagram for representing the bonding strength, i.e. the force per fiber surface of different fiber types in a cement-bonded building material.

The results of the pullout trials in the laboratory are represented in FIG. 1. Thereby, the very best results were shown by a polymer-modified fiber which is additionally mixed with minerals and additionally embossed. The maximal bonding strength—measured on a 7-day-old sample and an embedding depth of the fibers of 20 mm—was measured at 2.0 N/mm². The result was thus more than double that of an equal but unembossed fiber. In comparison to the non-modified fibers with an unembossed smooth surface and without incorporation of any auxiliary materials on the polymer, the bonding was even higher by a factor of 8. The unembossed and non-modified polymer fibers, thus those with a smooth surface, in comparison, could only accommodate significantly lower tensile forces. The modification by way of incorporating functional groups alone increases the surface tension of the polymer, which leads to an improved bonding between the fibers and cement as is shown by way of FIG. 1. The fibers very quickly lose their effect under load, as is evident from the diagram.

The plastic fibers presented here also differ significantly from those products with which one attempts to achieve an improved bonding to the cement and an increased pullout force, solely by way of admixing minerals or mineral bonding agents. It is often alleged that the aggregates assume a strong, controlled connection to the cement. This claim has been found to be wrong. Specifically, it was ascertained that the greatest part of the minerals or the mineral binding agent is embedded in the plastic, or is enveloped on the surface by way of emulsions, waxes, softeners etc. and these aggregates are therefore ineffective for the larger part. Furthermore, trials have also shown that finally the more favorable pullout behavior which was observed by the incorporations of minerals, is chiefly to be led back to the less even fiber surface and to the smaller fiber necking (contraction).

The casing of the bi-component fibers presents here consists of modified polymers which are optimized with regard to the adhesion to cement and processing properties (rheology). The surface tension of the fibers may be increased by way of incorporating functional groups (for example maleic acid anhydride or similarly functioning chemicals/active substances) in the casing polymer, which in turn leads to an improved wettability of this, and to an improved bonding between the cement and the fiber. The core-casing fibers with a diameter between 0.35 and 0.5 mm have been shown to be particularly advantageous in trials. The mass ratio between the core and the casing lies between 50%/50% and 80%/20%. A grain diameter <1 µm has been found to be favorable. Polyolefin raw materials, PL and HDPE as well as mixtures of these two polymers have been shown to be advantageous as the core. The casing of such a fiber is ad additionally provided with an embossing, in order to give it structured surface.

Figure 2:
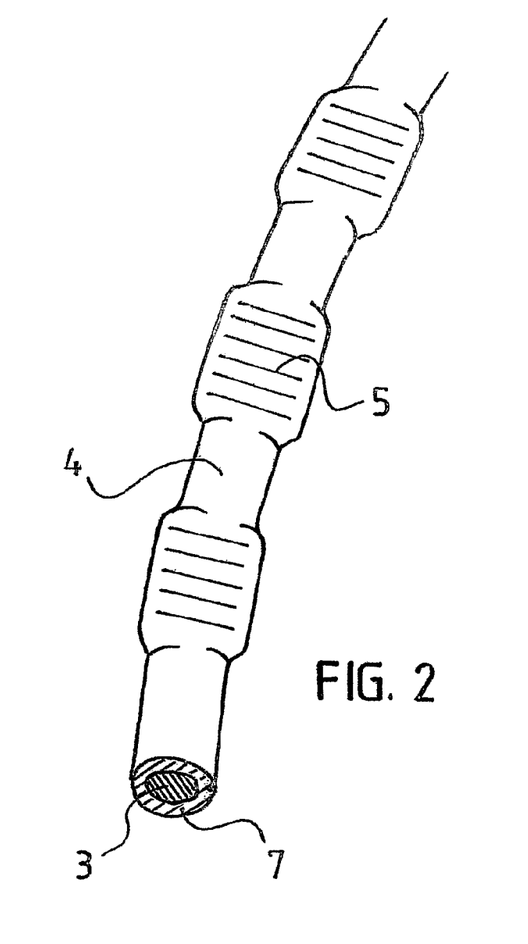
FIG. 2 shows an intermittently embossed fiber with an initially round cross section.

FIG. 2 shows a core-/casing fiber of plastic. This fiber consists of polyolefin materials, which is to say of polypropylene, polyethylene or mixtures thereof and other thermoplastic raw materials. The fiber has a diameter of 0.15 to 2 mm. It has a core 3 of a polypropylene, polyethylene or mixtures thereof and a different thermoplastic raw material, and a casing 7 of different polyolefin raw materials such as PP, HDPE or mixtures of these two polymers, enveloping this core 3. The manufacture of this bi-component fiber is effected in the extrusion process. Such a fiber may have a circular cross section, but also a cross which differs from this, thus for example an ellipsoidal, square, rectangular, bone-like or star-like or any other shape. As a particularity, the fiber on its surface is provided in a continuous manner or intermittently which a mechanical structuring 5 whilst it remains bare in the regions 4 between the structuring 5. The fiber is subjected to a certain amount of flattening at the embossed locations, and there is somewhat wider, with an elongate/oval cross section. In the shown example, the structuring 5 has been produced by an embossing. This mechanical structuring has the aim of macroscopically profiling the surface, in order by way of this, to increase the static friction between this bi-component fiber and the cement-like building material to which it is admixed. The embossing of as a means for this, has been show to be particularly, indeed surprisingly advantageous. Firstly, an embossing may be incorporated onto a fiber surface in a relatively simple and inexpensive manner, and secondly, with this, the surface profiled macroscopically, not however microscopically, thus remains smooth and within the structure. Grooves may be produced by way of such an embossing, which run transversely to the fibers but also grooves which run at an oblique angle to the fibers. Combinations of such groove structures may be embossed, such as with grooves running transversely to the fibers which are superimposed by the grooves running at an oblique angle thereto. However, also grooves running exclusively at an oblique angle to the fiber may cross one another. If such fibers are cast in section lengths of approx. 10 to 80 mm in a cement-like building material, in particular in concrete, then—by way of the improved fiber matrix bonding its tensile strength is increased and the post failure behavior is decisively improved. One may admix larger fiber volume shares as with steel-fibers as a result as the greater flexibility of the plastic. The density of such fibers of only approx. 0.9-1.1 g/cm³ is lower by approx. a factor of 8 in comparison to the density of steel which is 7.8 g/cm³. For this reason, as a whole with regard to weight, significantly lower dosing quantities and more homogenous material characteristics result with the plastic bi-component fiber types show here, with the same performance when compared to steel fibers.

Figure 3:
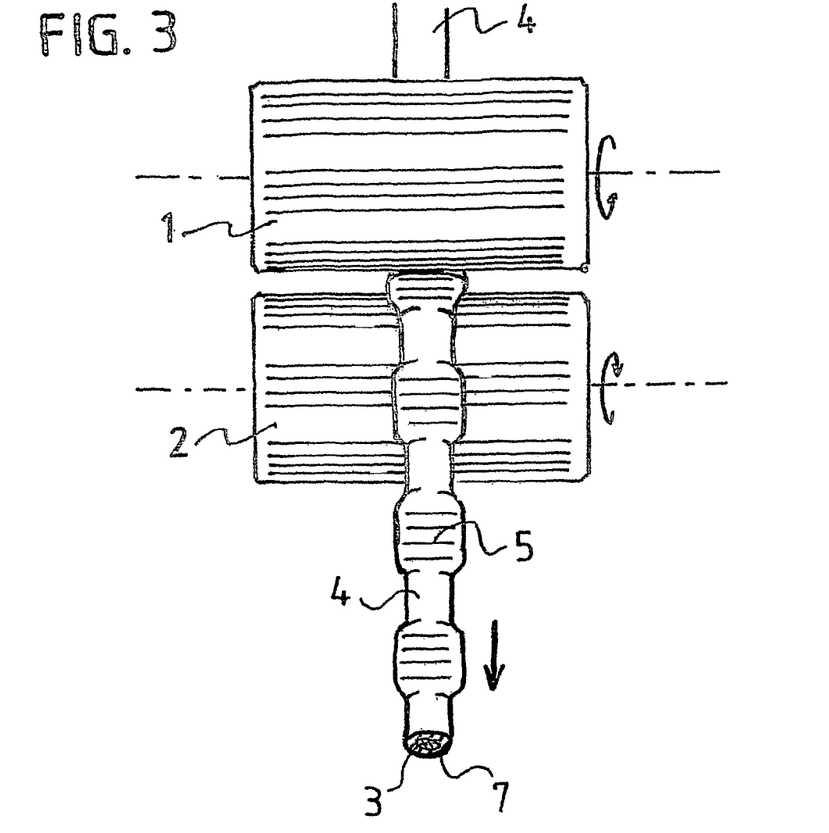
FIG. 3 shows a device for embossing with two rollers arranged parallel to one another, represented schematically.

The embossing of the bi-component fibers may be effected in the simplest manner by way of the fiber running through two embossing rollers 1, 2 in an endless manner, and thereafter being cut into section of the desired length, as is schematically represented in FIG. 3 by way of an arrangement for this embossing. Continuous or interrupted or intermittent embossing 5 are created by way of the nature of the embossing rollers 1, 2 and their setting (embossing rib to rib or offset). The rollers 1, 2 thus have an embossing at a certain locations, and none at others. The embossing depth in any case should be larger than 10% of the average fiber diameter.

Figure 4:
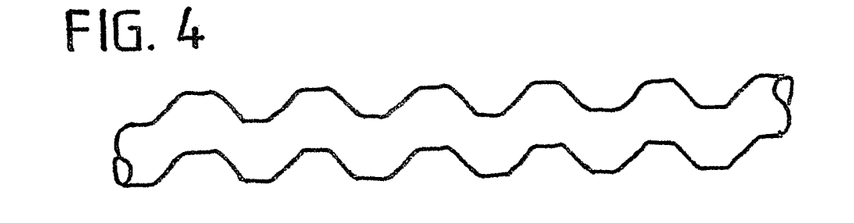
FIG. 4 shows an embossing type of the fibers, seen from the side.
Figure 5:
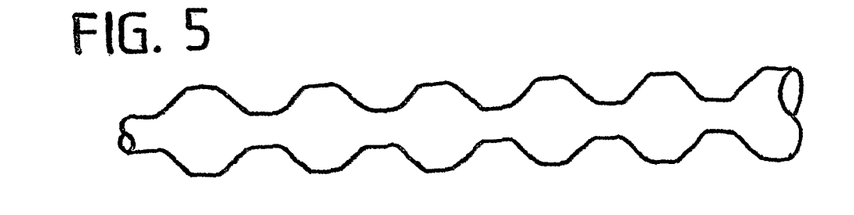
FIG. 5 shows a further embossing type of the fibers, seen from the side.
Figure 6:
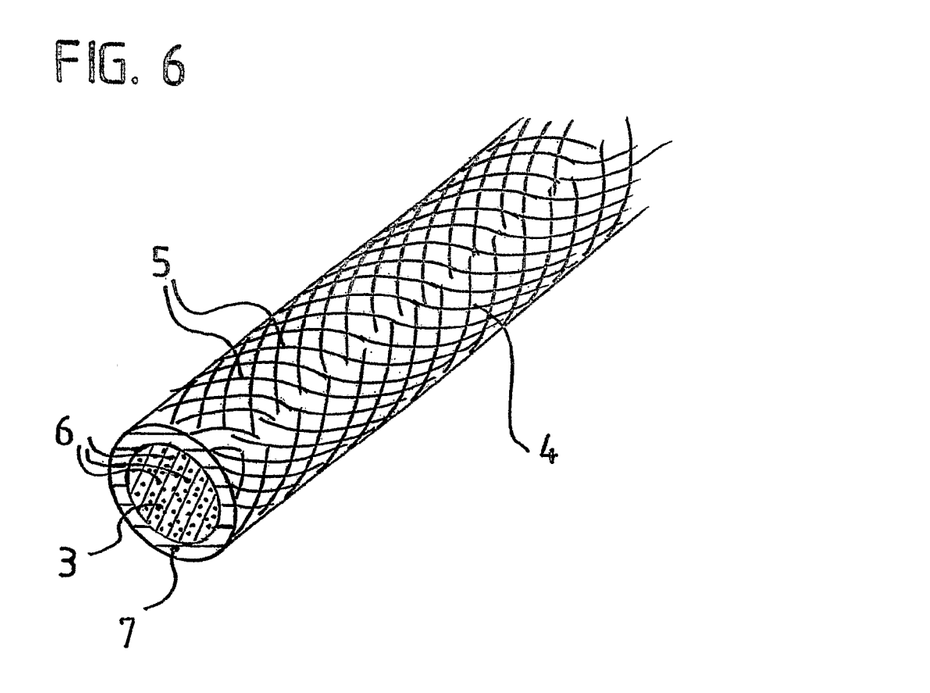
FIG. 6 shows an embossed fiber with a fiber core and fiber casing of different materials, with fine particles or nanoparticles in the core and/or casing polymer.

Another embossing type of the fibers in seen from the side in FIG. 4. Here, the bi-component fibers run through two embossing rollers in the manner of gearwheels at distance to one another of the desired fiber thickness. Accordingly, the fiber was embossed in a zigzag shape, whilst the fibers shown in FIG. 5 ran through between two embossing rollers which are likewise configured in a manner of a gearwheel, but run to one another such that the teeth in each case one another as a small distance, so that only where these meet, are the fibers running through squeezed. Then a fiber with a constantly changing shape of the cross-sectional surface is formed. A continuously embossed fiber with fiber core 3 and fiber casing 7 of different materials is represented in FIG. 6. The structure grooves 5 encompass the whole surface of the fiber and is only the regions 4 between the grooves 5 that the fiber remains smooth. The core 3 may furthermore be mixed with micro and nanoparticles 6 in the form of mineral fillers, metallic salts, glass particles or small glass balls or fiber materials of all types, which has the effect that the reduction of the fiber diameter is reduced on tensile loading, and the elongation at break is reduced. By way of this, one succeeds in further increasing the modulus of elasticity of these fibers, which leads to an increase in the bonding strengths, and a uniform pullout behavior out of the building materials results.

Preferably, the casing polymer 7 is mixed with mineral nanoparticles, which means with those a diameter smaller than 1 μm. This measure however does not serve for the direct improvement of the adhesion between the fibers and the concrete, since most mineral particles are completely enveloped by plastic. This is chiefly effected by way of chemically combinations, for example by way of incorporating cement or by way of minerals particles, into the polymer, or by way of a mechanical effect, such as by way of a rougher surface nature. A harder surface is however achieved by way of incorporating nanoparticles into the casing polymer. The bonding to the cement—after the embossing—is better by way of this. The force take-up is effected more quickly and more force may be accommodated. One achieves a smaller surface wear with the fiber pullout. For this reason, one ascertains a larger and longer lasting pullout resistance over the desired distance of 3 mm sagging of the test body. The fibers are stiffer since it is mainly the outer casing which is responsible for the degree of stiffness. One achieves higher modulus of elasticity and a smaller "necking" (tapering) on pulling out/loading by way this, which in turn a positive effect on the bonding. The highest tensile force however is generally reduced by way of the incorporation of foreign particles. With a mass ratio of 70% core and 30% casing, this reduction of the tensile force is only effective in 30% of the casing polymer. These conditions are to be deduced from FIG. 7. Here, the strength values of two identical plastic polymers are shown, with the single difference that with the type L, the casing is refined with nanoparticles, whilst the casing of the type M was untreated. This incorporation of minerals substances exclusively in the casing also entails commercial advantages. A polymer which contains incorporated nanoparticles, is between 3 and 4 more expensive than standard polymers. It is therefore an essential difference whether—with a full fiber—100% of the polymer needs to be refined with these special products, or only the casing, with about 30% mass share of the total product.

With a specific embossing, which has been shown to be advantageous and which is required also with the relative short fire lengths, the distance from tip to tip is just about 0.65 mm. An embossing at small distances increases the homogeneity of the reinforcing and its pullout forces. The filaments are already finished with regard to their inner structure before the embossing. The profile of the embossing rollers may be transmitted 1:1 onto the filaments and accordingly the structuring of the filament surface may be easily adapted to the technical demands. Depending on the wishes, one may apply other embossing rollers for producing smaller or larger bulges, cornered or rounder bulges, those with a small distance, with large or small waves etc. Such flexibility in manufacture is not conceivable with filaments which according to the method, are only stretched after the embossing. It has thus been shown to be very essential that the completely and homogeneously stretched filaments which in their diameter are identical are only embossed at a later stage. By way of this, the completely stretched and longitudinally orientated polymer is only displaced and reoriented laterally or in depth, whilst its structure remains the same. Weakening thin locations with a weaker polymer structure are avoided.

Figure 8:
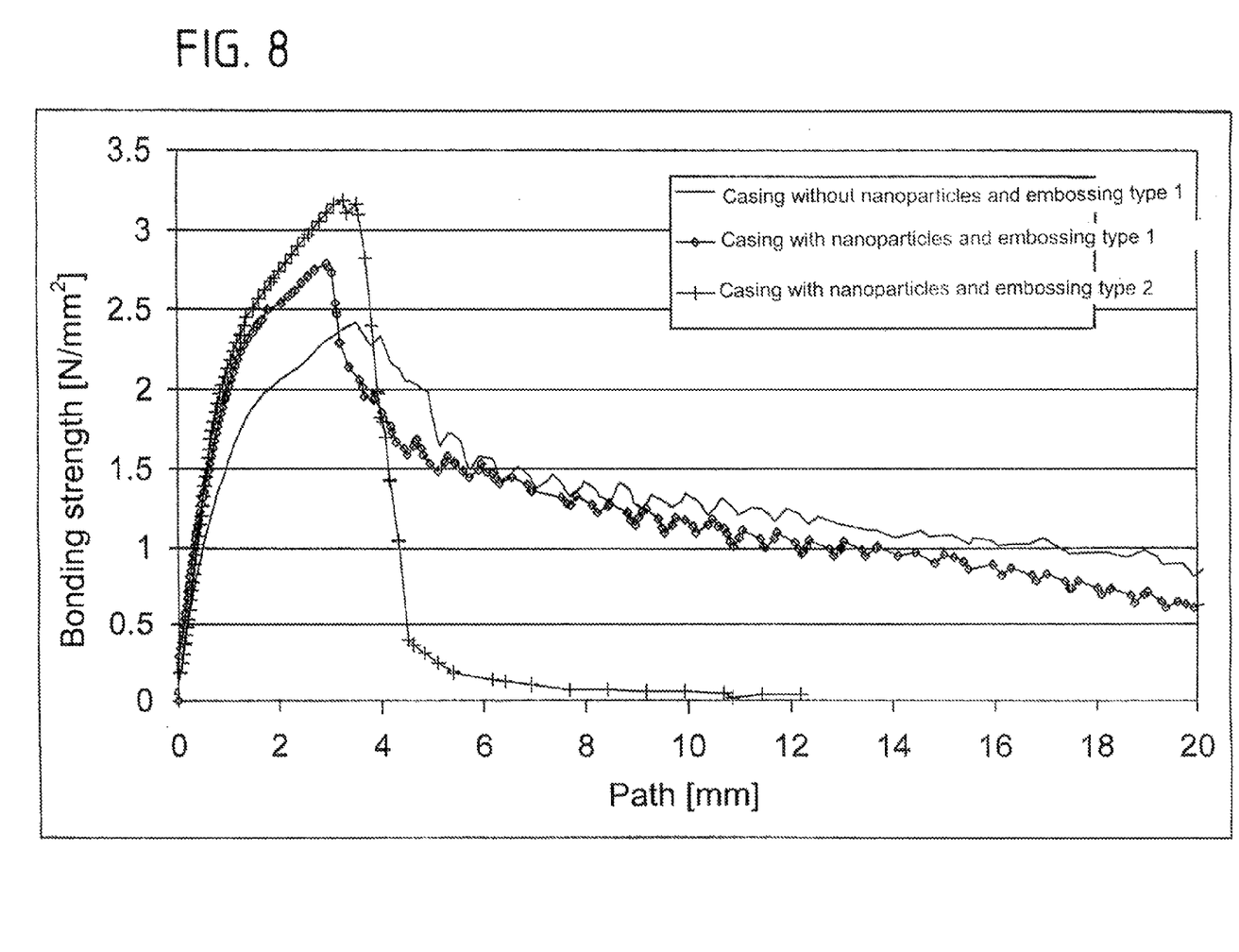
FIG. 8 is a force-path diagram for representing the composite strength of fibers with nanoparticles and embossing in the casing polymer, in comparison to a fiber without nanoparticles and embossing in the casing polymer.

FIG. 8 shows a force-path diagram for representing the bonding strength, i.e. the force per fiber surface of two differently embossed fiber types with nanoparticles in the casing polymer, in comparison to the same fibers without embossing and without nanoparticles in the casing polymer. It has been shown that the best results are achieved with a combination of a suitable embossing and the application of nanoparticles in the casing polymer. A top value of 3.17 N/mm$^2$ was achieved here.

In order to achieve the desired mechanical properties, usually approx. 0.3% by volume of steel fibers is admixed in cement-bonded building materials. In the case of the bi-component plastic fibers presented here, one uses 0.5% by volume which however results in a 4.8 times lower mass addition, with significantly improved and more regular post-failure properties. Furthermore, the handling of such light plastic fiber section of 10 to 80 mm length per se is much simpler than those of steel fibers. A corrosion danger does not exist at all with these plastic fibers, as is otherwise the case with steel fibers. The plastic fibers described here are furthermore resistant to alkaline.

Finally, it is not only the plastic fibers themselves which is decisive for a technically meaningful application in concrete. At the end, the fibers must be incorporated into the concrete is a suitable form, in order there to display their effect. Even the best fibers are of no use if no homogenous distribution may be achieved in the concrete. If the fibers incorporated into the concrete in a somewhat loose manner, such as blown in or scattered in heaps, then nests of fibers are often formed, into which the concrete does not completely penetrate. These accumulations of fibers worsen the strength and the regularity of the concrete.

Figure 9:
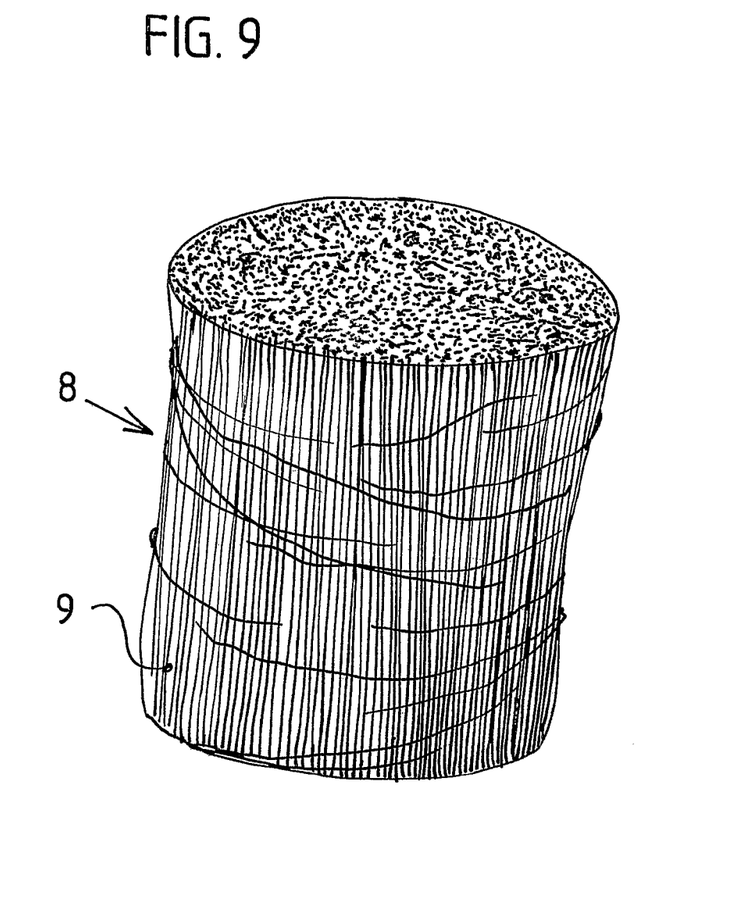
FIG. 9 shows an individual bundle with thousands of plastic fiber sections, for incorporation into the cement-bonded material to be mixed.

A surprisingly effective solution was found in wrapping a few thousand fibers as a bundle, with a water-soluble plastic film, and then cutting off sections or bundles. FIG. 9 shows such a bundle 8 in order to provide an idea of this. It measures approx. 50 mm in length and diameter, weighs 55 grams and contains 6000 fibers and is enclosed by a transparent, water-soluble and inert plastic film 9, but open the bottom and top, and cut in a plane there. The bundles 8 from then are held together in a reliable manner by this plastic film. Only after incorporating into the concrete does the film dissolve, and the fibers distribute in the concrete. The individual fibers however do not stick to one another, but are only held together by friction. On dissolving the enveloping film, a rapid distribution of the fibers in the concrete results by way of this. The fiber are then all directed in an equal manner in such bundles 8. One may admix up to 2% by volume of fibers to the concrete without any problem. The parallel position of the fibers in the bundles permits a homogeneous distribution. The wrapping film is completely water soluble and furthermore is inert. As proven, it does not influence the quality of the concrete. With a fiber component in the concrete of 4.5 kg fibers (0.5% by volume or 492'000 individual fibers) only needs to incorporate 82 pieces of such fiber bundles. In contrast to a packaging in a small bag, hardly any air is enclosed in these bundles, by which means they do not float up on incorporation into the concrete, and may thus be better mixed. On mixing the concrete, the bundles distribute, fall apart, but the fibers do not snag, but are enclosed in an intimate manner by the concrete. The packaging of the plastic fibers however also has significant commercial advantages: they are significantly more compact that the binding of loose fibers. 4.5 kg of fibers requires boxes of only about 0.015 m$^2$ content. The packagings are rectangular. For this reason they offer good stacking possibilities on standardized pallets. The compact shape also entails savings on transport.

The invention claimed is:

1. A method for making plastic fiber for application in concrete with largest grain diameters >4 mm, with an average diameter of 0.15 to 2 mm, corresponding to approximately 160 to 28'000 dtex (Decitex =grams per 10,000 running meters), the method comprising the steps of:
using a co-extrusion process, forming a bi-component fiber having a central core and a casing around the central core, the central core and the casing containing different pure polymers or polymer mixtures, then
stretching the co-extruded bi-component fiber by a factor of 5 to 15, and
after the co-extruded bi-component fiber has been stretched, embossing a structured or grooved surface onto the co-extruded stretched bi-component fiber,
the step of embossing the structured or grooved surface onto the co-extruded stretched bi-component fiber comprising performing the embossing such that a depth of the embossing is more than 10% of an average fiber diameter, and a maximal distances of structure tips within incorporated structures of the embossing in an axial direction lie in a region between 0.5 mm and 3 mm.

2. The method of claim 1, further comprising selecting the bi-component fiber to be a polyolefin fiber that consists of polypropylene or polyethylene or mixtures thereof or other thermoplastic raw materials.

3. The method of claim 1, further comprising selecting the central core to be made of one or more polymers with a low melt flow rate (MFR) and a narrow molecular weight distribution, and selecting the casing to be made of one or more polymers with a higher MFR and a broader molecular weight distribution.

4. The method of claim 1, wherein the step of embossing the structured or grooved surface onto the co-extruded stretched bi-component fiber comprises forming a structured surface that is a single- or multi-sided mechanical embossing which is right-angled, diagonal, crossing and of any other shape.

5. The method of claim 1, further comprising incorporating mineral, metallic or ceramic particles in the form of fillers, salts, glass particles, small glass balls or fiber materials into the core polymer, the casing polymer or into both polymers.

6. The method of claim 1, further comprising incorporating 3% by mass to 25% by mass of fine mineral nanoparticles with a grain diameter of $\leq 1$ μm in the casing polymer.

7. The method of claim 1, further comprising incorporating functional groups into the casing polymer to increase surface tension and polarity of the bi-component fiber.

8. The method of claim 1, further comprising packaging the bi-component fiber in bundles of several thousand sections which are wrapped with a water-soluble plastic film and are held together by the water-soluble plastic film.

9. The method of claim 1, further comprising:
packaging the bi-component fiber in compact bundles of several thousand sections, with section lengths of 10 mm to 80 mm,
cutting off the bundles on both sides in a plane manner, and holding the bundles together by a water-soluble, inert plastic film.

10. The method of claim 1, further comprising:
packaging the bi-component fiber in compact bundles of several thousand sections, with section lengths of 10 mm to 80 mm,
wrapping the bundles with a water-soluble plastic film; and
mixing cement-bonded building material into the water-soluble plastic film.

11. The method of claim 1, wherein the step of embossing a structured or grooved surface onto the co-extruded stretched bi-component fiber comprises embossing a continuous structuring onto the co-extruded stretched bi-component fiber.

12. The method of claim 1, wherein the step of embossing a structured or grooved surface onto the co-extruded stretched bi-component fiber comprises embossing an interrupted structuring onto the co-extruded stretched bi-component fiber such that the co-extruded stretched bi-component fiber includes regions lacking an embossed structured or grooved surface between regions having an embossed structured or grooved surface.

13. The method of claim 12, further comprising flattening only the regions having an embossed structured or grooved surface such that the regions lacking an embossed structured or grooved surface are not flattened.

14. The method of claim 1, wherein the step of forming the bi-component fiber using the co-extrusion process comprises forming a co-extrusion die used in the co-extrusion process such that the casing envelops the central core upon formation of the bi-component fiber.

15. The method of claim 1, wherein the step of embossing a structured or grooved surface onto the co-extruded stretched bi-component fiber comprises forming grooves at an embossed part of the co-extruded stretched bi-component fiber to improve adhesion of the concrete to the co-extruded stretched bi-component fiber.

16. The method of claim 1, wherein the step of embossing a structured or grooved surface onto the co-extruded stretched bi-component fiber comprises passing the co-extruded stretched bi-component fiber between embossing rollers.

17. The method of claim 1, wherein the step of embossing a structured or grooved surface onto the co-extruded stretched bi-component fiber comprises forming grooves extending in a direction transverse to an axial direction of the co-extruded stretched bi-component fiber.

18. The method of claim 1, wherein the step of embossing a structured or grooved surface onto the co-extruded stretched bi-component fiber comprises forming grooves extending at oblique angles relative to an axial direction of the co-extruded stretched bi-component fiber.

19. The method of claim 1, wherein the step of embossing a structured or grooved surface onto the co-extruded stretched bi-component fiber comprises forming grooves extending in a direction transverse to an axial direction of the co-extruded stretched bi-component fiber and forming additional grooves extending at oblique angles relative to the axial direction of the co-extruded stretched bi-component fiber.

20. The method of claim 1, further comprising:
selecting material for the core to provide high tensile strength for the bi-component fiber; and
selecting material for the casing to enable the casing to bond to the concrete.

* * * * *